United States Patent [19]
Bartlett

[11] Patent Number: 5,733,197
[45] Date of Patent: Mar. 31, 1998

[54] CONSTANT VELOCITY RATIO UNIVERSAL JOINTS

[75] Inventor: Stephen Charles Bartlett, Bridgnorth, England

[73] Assignee: GKN Automotive AG, Germany

[21] Appl. No.: 594,935

[22] Filed: Jan. 31, 1996

[30] Foreign Application Priority Data

Apr. 7, 1995 [GB] United Kingdom .................. 9507226

[51] Int. Cl.$^6$ .................................................. F16D 3/30
[52] U.S. Cl. ............................................. 464/123; 464/905
[58] Field of Search ........................................ 464/123, 122, 464/124, 120, 905, 112, 109

[56] References Cited

U.S. PATENT DOCUMENTS

| | | | |
|---|---|---|---|
| 2,211,388 | 8/1940 | Salvetti | 464/122 |
| 2,341,074 | 2/1944 | Dodge | 464/122 |
| 2,917,911 | 12/1959 | Wildhaber | 464/123 |
| 3,076,322 | 2/1963 | Wildhaber | 464/123 |
| 3,593,541 | 7/1971 | Kuroda | 464/124 X |
| 4,689,035 | 8/1987 | Orain | 464/124 |

FOREIGN PATENT DOCUMENTS 512220  8/1939  United Kingdom .

*Primary Examiner*—Daniel P. Stodola
*Assistant Examiner*—Gregory J. Strimbu
*Attorney, Agent, or Firm*—Arnold B. Silverman; Eckert Seamans Cherin & Mellott, LLC

[57] ABSTRACT

A universal joint comprising a first joint member having a rotational axis and a body connected to the first joint member for pivotal movement relative thereto about a pivot axis intersecting and perpendicular to the rotational axis. The body comprises two trunnions extending along a trunnion axis perpendicular to the pivot axis of the body and respective rollers are carried by the trunnions for rotation about the trunnion axis. The universal joint also comprises a second joint member having a rotational axis and affording two tracks extending lengthwise of the second joint member and diametrically opposed to one another about the rotational axis of the second joint member with the rollers being received in the tracks for torque transmission between the joint members by way of the body and rollers. Also provided for is centering the rotational axes of the first and second joint members relative to one another, and a guide member having respective portions cooperating with the first and second joint members and the body, and operative to maintain the trunnion axis in a plane bisecting the angle between the rotational axes of the first and second joint members.

12 Claims, 3 Drawing Sheets

CONSTANT VELOCITY RATIO UNIVERSAL JOINTS

BACKGROUND OF THE INVENTION

Field of the Invention

This invention relates to universal joints, for torque transmission, of the type generally known, and herein referred to for convenience, as bipode joints. More specifically, the invention relates to a bipode type of joint which in accordance with the invention is made to have constant velocity ratio torque transmitting characteristics.

Bipode joints for torque transmission are generally well known, such a joint comprising a first joint member in the form of a body having two oppositely directed trunnions extending therefrom, respective rollers carried by the trunnions and rotatable thereabout, and a second joint member affording two tracks with which the external peripheral surfaces of the rollers respectively engage. Such joints are simple and robust but they do not have constant velocity ratio characteristics. When one of the joint members is rotating about its rotational axis with a constant angular velocity, the angular velocity of the other joint member varies cyclically although it will be appreciated that the mean angular velocities of the two joint members are, of course, the same.

Because they are not constant velocity ratio joints, simple bipode joints are not suitable for use in the drive lines of motor vehicles. There are many types of joints which are constant velocity ratio or near constant velocity ratio joints and therefore suitable for use in automotive drive lines, e.g. tripode joints or joints in which torque is transmitted by balls between the joint members, but such joints are more complex and expensive.

SUMMARY OF THE INVENTION

It is broadly the object of the present invention to provide a joint which is generally of the bipode type and therefore is relatively simple, but which is a constant velocity ratio joint and therefore is suitable for automotive drive line use.

According to the present invention, we provide a universal joint comprising:

a first joint member having a rotational axis;

a body connected to said first joint member for pivotal movement relative thereto about a pivot axis intersecting and perpendicular to said rotational axis;

said body comprising two trunnions extending along a trunnion axis perpendicular to said pivot axis of the body;

respective rollers carried by the trunnions for rotation about the trunnion axis;

a second joint member having a rotational axis and affording two tracks extending lengthwise of the second joint member and diametrically opposed to one another about the rotational axis of the second joint member, said rollers being received in said tracks for torque transmission between the joint members by way of said body and rollers;

centering means for centering the rotational axes of the first and second joint members relative to one another;

and a guide member have respective portions cooperating with the first and second joint members and the body, and operative to maintain the trunnion axis in a plane bisecting the angle between the rotational axes of the first and second joint members.

In a joint in accordance with the present invention, the pivotal connection of the body, which has the trunnions on which the rollers are supported, to the first joint member, and the provision of a guide member such that the trunnion axis always lies in the plane bisecting the angle between the rotational axes of the joint members (such plane referred hereafter referred to for convenience as the bisector plane), has the effect that the joint has constant velocity ratio characteristics. At the same time, the joint retains the relative simplicity and robustness, characteristic of a bipode joint as compared with other types of constant velocity ratio universal joints, although it will, of course, be appreciated that the joint according to the invention is more complex than the simple bipode joint as above described.

When we refer herein to centering, we mean the maintenance of the position of one joint member relative to the other such that when the rotational axis of one joint member is at a fixed position, the rotational axis of the other joint member always intersects the first rotational axis and, in particular, does not orbit thereabout.

The centering means may comprise a part-spherical surface provided on the body or an associated component engaging portions of a part-cylindrical surface provided ill tile interior of the second joint member between the tracks thereof.

As an alternative means of centering the two joint members relative to one another, end portions of the trunnions and/or of the rollers carried thereby may cooperate with guide surfaces at the bases of the tracks in the second joint member. The guide surfaces at the bases of the tracks may comprise respective portions of a cylindrical surface, whilst the ends of the trunnions and/or the rollers carried thereby comprise respective portions of a part-spherical surface having substantially the same radius of curvature as that of said cylindrical surface (with a running clearance allowed therebetween).

The guide member preferably has a first end portion engaging the first joint member, a second end portion engaging the second joint member, and a portion between said end portions engaging said body, said portions of the guide member being so spaced and configured as to provide the necessary guidance of the body.

The guide member may cooperate with the body and the second joint member by way of respective part-spherical surfaces provided on the guide member.

Preferably the guide member engages the first joint member by way of a projection on the guide member and a complementary recess in the joint member, said projection and recess being so configured as to prevent clearance developing therebetween when the joint articulates.

Such configuration is conveniently achieved by providing at least the projection with a cross-sectional shape which is generally that of a gear tooth. Preferably the form of the projection is that of a surface of revolution of the gear tooth section about a transverse axis extending through the centre of curvature of the part-spherical surface of the guide member which engages said body.

Such configuration of guide member ensures that the joint is truly a constant velocity ratio joint and eliminates the need for the provision of additional components, spring biasing, or other expedients which would have to be provided if the configuration of the guide member were such that clearances develop when the joint articulates.

The guide member preferably is captive between the first joint member and body without the requirement for additional retaining components.

If the joint is a plunging joint (i.e. one able to accommodate relative axial movement between the two joint members) the surface of the guide member may cooperate with the second joint member or a component associated therewith by way of an internal cylindrical surface provided in the second joint member or said component, to allow for the relative axial movement. Alternatively the surface of the guide member may cooperate with a part-spherical surface provided in a component associated with the second joint member which component is movable lengthwise of the rotational axis of the second joint member.

Preferably the rollers have substantially cylindrical external peripheral surfaces, and the tracks in the second joint member have planar opposing sides with which said surfaces of the rollers engage.

The rollers may be constrained against outward movement by cooperation with the trunnions.

However, it would be within the scope of the invention if the external peripheral surfaces of the rollers were to be of other than cylindrical or substantially cylindrical configuration, e.g. curved in cross-section, in which case opposing side portions of each track would be of corresponding curved cross-sectional shape, and the rollers would then be constrained against outward movement by cooperation with the track.

DESCRIPTION OF THE DRAWINGS

The invention will now be described by way of example with reference to the accompanying drawings, of which.

DESCRIPTION OF PREFERRED EMBODIMENTS

Figure 1:
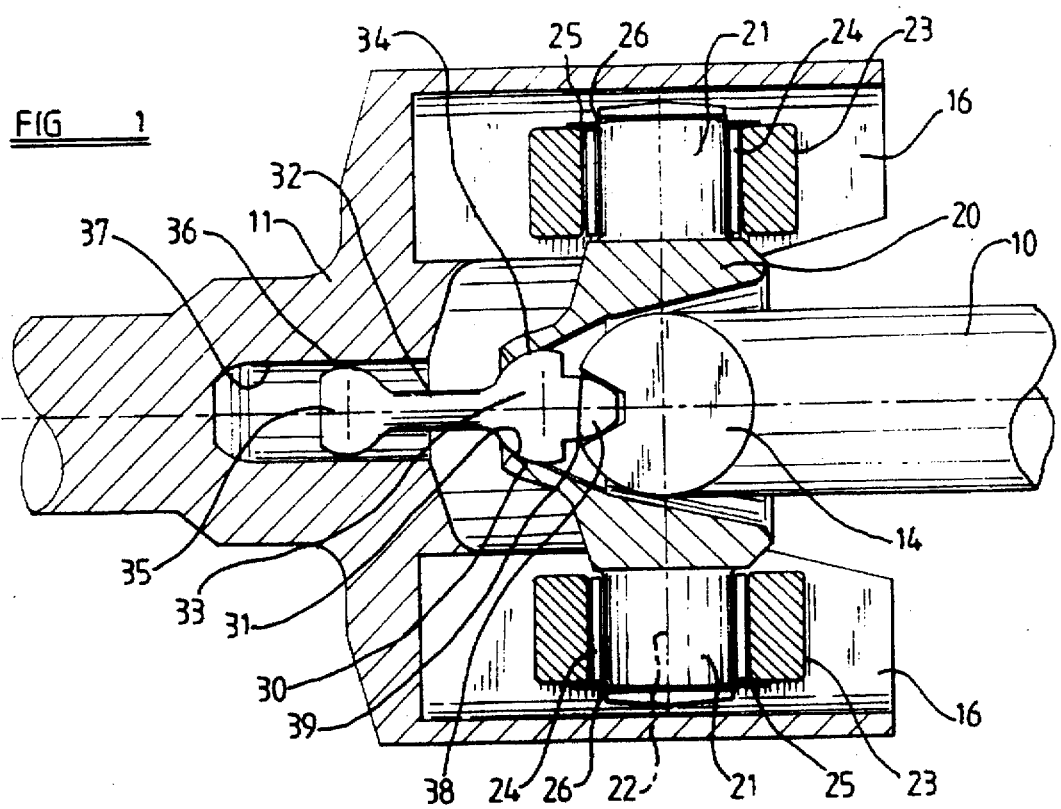
FIG. 1 is a longitudinal section through an embodiment of joint in accordance with the invention, in the aligned condition.
Figure 2:
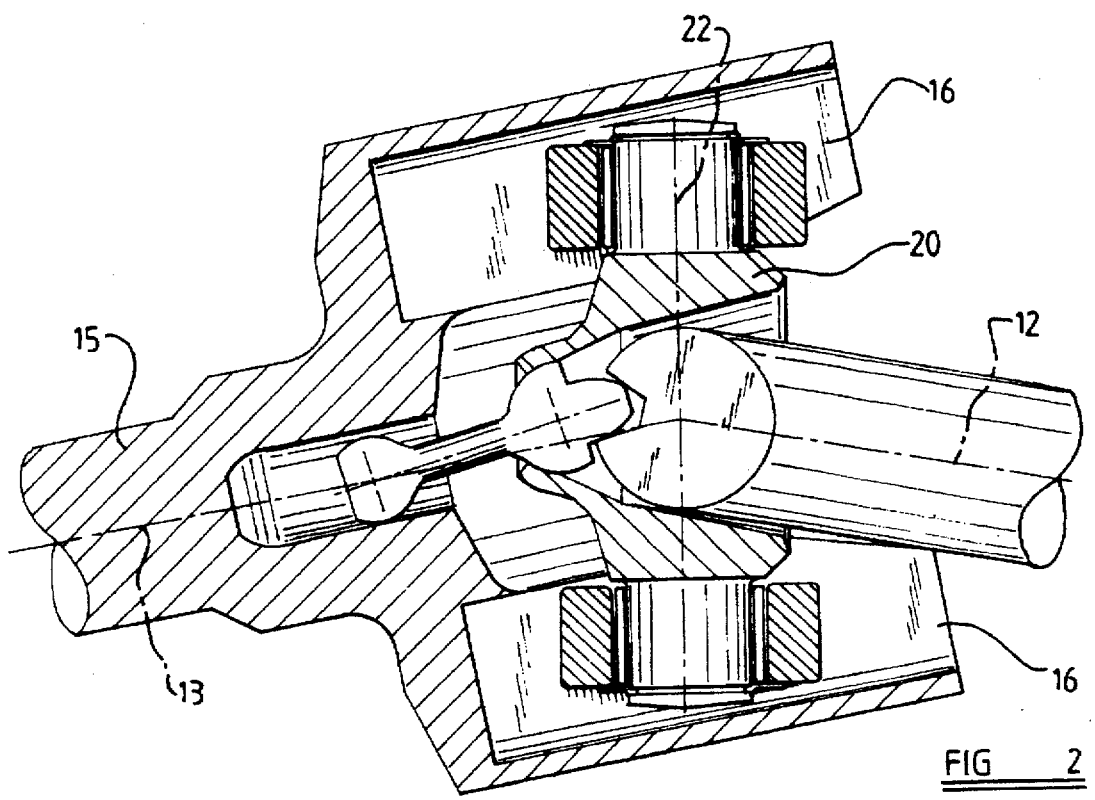
FIG. 2 is a section as FIG. 1, but with the joint in the articulated condition.
Figure 3:
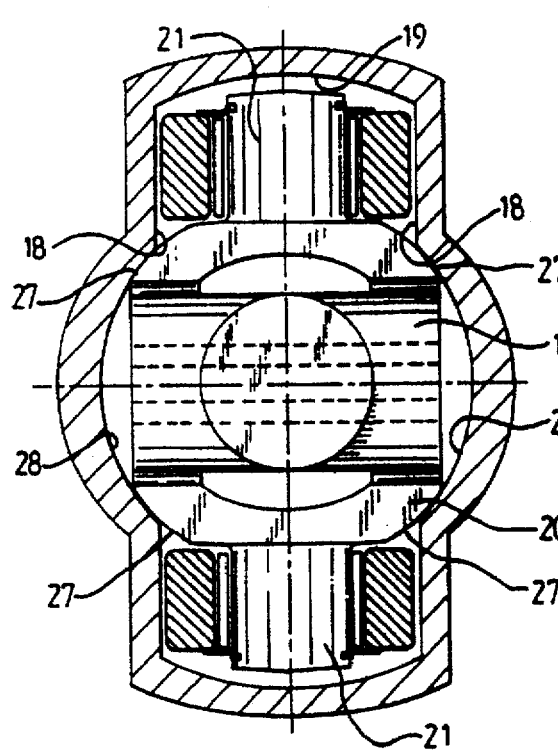
FIG. 3 is a transverse section through the joint of FIG. 1.

Referring firstly to FIGS. 1, 2 and 3 of the drawings, the illustrated joint comprises a first joint member 10 and a second joint member 11, the joint members having respective rotational axes 12, 13. The joint member 10 is generally in the form of a shaft-like element terminating in a transverse cylindrical portion 14. The joint member 11 is in the form of a hollow body closed at one end from which a shaft portion 15 extends, the body being provided internally with two tracks 16 diametrically opposed to one another about the axis 13 and each having parallel opposed side surfaces 18 and a base portion 19.

A body 20 is pivotally supported on the cylindrical portion 14, the body 20 having two opposed trunnions 21 which extend outwardly into the tracks 16 in the joint member 11. The trunnions have cylindrical peripheral bearing surfaces, being aligned with one another and having a common axis 22. Respective rollers 23 are received on the trunnions 21 and are rotatable thereabout with the intermediary of needle bearing rollers 24. The rollers 23 are retained on the trunnions 21 by respective retaining rings 25 and circlips 26 engaging grooves in the trunnions. The rollers 23 have substantially cylindrical external peripheral surfaces engaging the opposed side surfaces 18 of the tracks 16.

Adjacent the trunnions 21, the body 20 has respective portions 27 of a spherical surface. These spherical surface portions 27 engage portions 28 of a cylindrical surface inside the joint member 11 between the tracks 16 thereof. Thus the body 20 is centered relative to the joint member 11, and consequently the joint member 10 also is centered relative to the joint member 11 so that the rotational axes of the two joint members always intersect one another.

The body 20 has a nose portion 30 which extends forwardly towards the closed end of the joint member 11 from which the shaft portion 15 extends. The nose portion 30 has an internal part-spherical surface portion 31. A guide member 32 has a bulbous portion 33 provided with an external part-spherical surface 34 which cooperates with the surface 31 of the body 20. The guide member 32 further comprises a bulbous end portion 35 with an external part-spherical surface 36, which fits closely within a cylindrical bore 37 at the closed end of the joint member 11. At the opposite end of the guide member 32, beyond its portion 33, there is a projection 38 whose cross-sectional shape resembles that of a gear tooth and which engages in a recess 39 which extends across the portion 14 of the joint member 10, transversely to the rotational axis 12 of the joint member 10.

Figure 6:
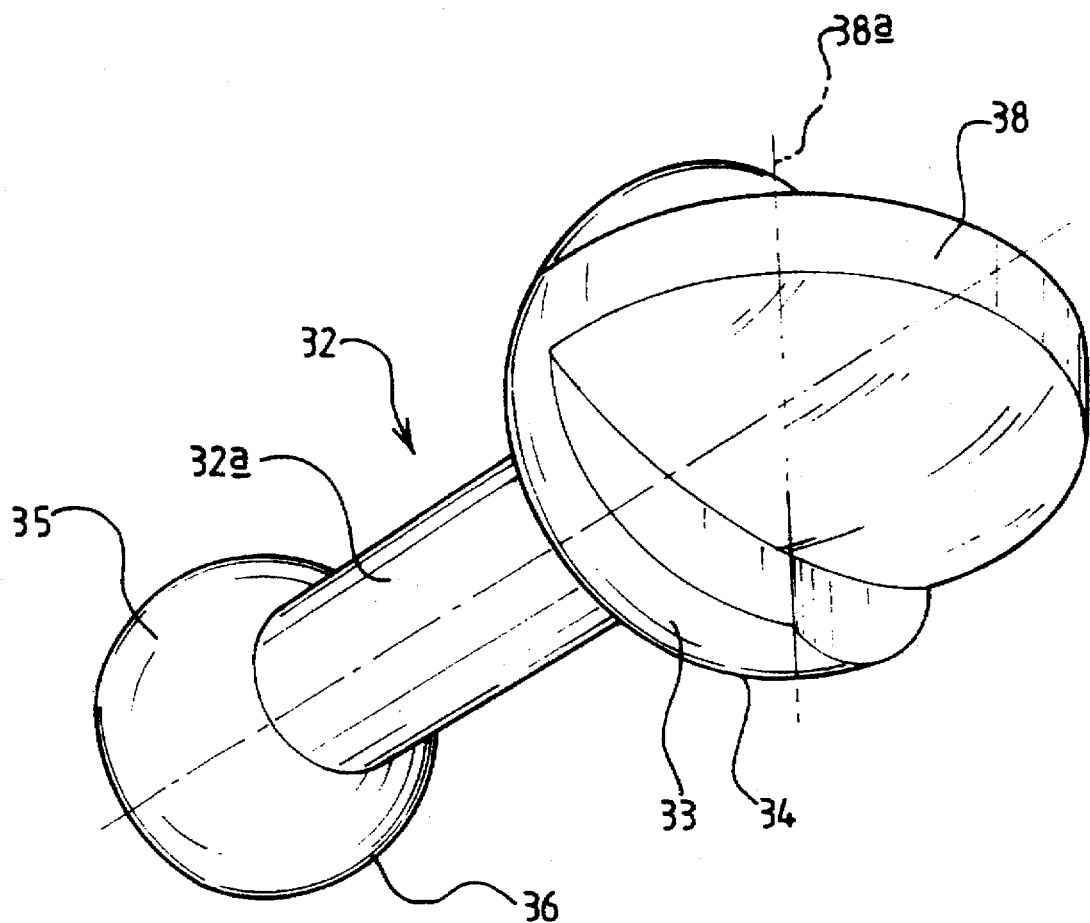
FIG. 6 is an enlarged perspective view of part of the joint of FIG. 1.

FIG. 6 shows in greater detail and in a perspective view the configuration of the guide member 32. It comprises a stem indicated at 32a with the bulbous portion 35 having part-spherical surface 36 at one end, and at its opposite end the portion 33 with part-spherical surface 34 and the projection 38 extending therefrom. In the section shown in FIG. 1, the cross-sectional shape of the projection 38 resembles that of a gear tooth, but the shape of such projection is actually a surface of revolution of such a tooth-like form about a transverse axis 38a which passes through the centre of curvature of the part-spherical surface 34. This configuration of the projection 38, together with the complementary configuration of the recess 39 with which it engages, has the effect that when the joint articulates as shown in FIG. 2, no clearances develop between the guide member 32, the body 20, and the joint member 10. Thus it is unnecessary to provide any means for taking up clearances which would develop under joint articulation if the present configuration of the projection 38 were not adopted. Consequently, the joint does not have to be provided with any means such as spring-loaded elements or the like for taking up such clearances.

Instead of the projection 38 being on the guide member 32 and the recess 39 in the joint member 10, the joint member could be provided with a projection and the guide member with a complementary recess.

The above described configuration of guide member 32 cooperating with the joint members 10, 11 and with the body 20 has the result that, when the joint is articulated as shown in FIG. 2, the trunnion axis 22 lies in a plane which bisects the angle between the rotational axes 12, 13 of the joint members. The axis 22 remains in such a plane as the joint rotates in the articulated condition. Thus the joint is caused to have constant velocity ratio running characteristics. The joint is able to accommodate plunge, i.e. relatively axial movement between the joint members, since the rollers 23 can move freely along the tracks 16 and the portion 35 of the guide member 32 is able to move axially within the bore 37 during such movement. It will be understood that, as an alternative, the joint could be made to be axially fixed by restraining the body 20 or the bulbous portion 35 against axial movement relative to the joint member 11.

Figure 4:
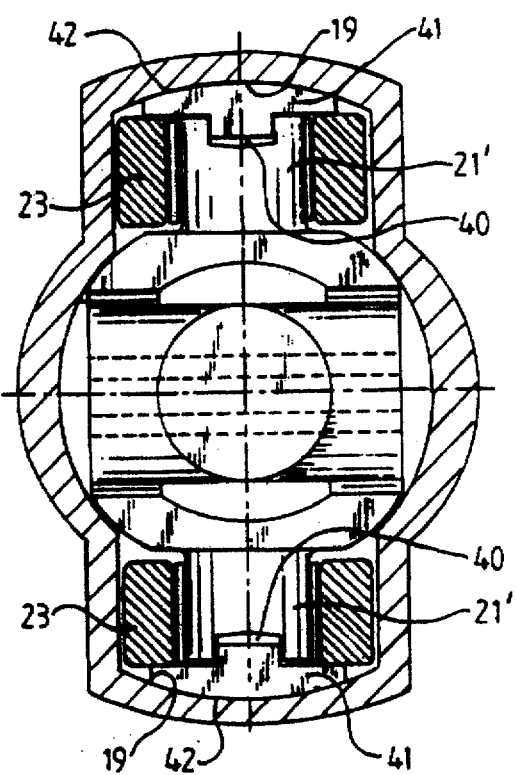
FIGS. 4 and 5 are views as FIG. 3 but of modified embodiments of joint.

Referring now to FIG. 4 of the drawings, this shows a modification of the joint above described, in which centering between the joint members is achieved by engagement with the tracks in the second joint member 11, rather than by engagement with the first joint member 10 between the tracks. In FIG. 4, the ends of the trunnions 21, have shallow recesses 40 in which are received respective spigot portions of centering pads 41. The centering pads 41 have part-spherical surfaces 42 which engage the base portions 19 of the tracks, which base portions are respective parts of a cylindrical surface. The pads 41 further engage the rollers 23 to retain them on the trunnions and, in particular, prevent them from moving outwardly under centrifugal force to engage the base portions of the tracks.

Figure 5:
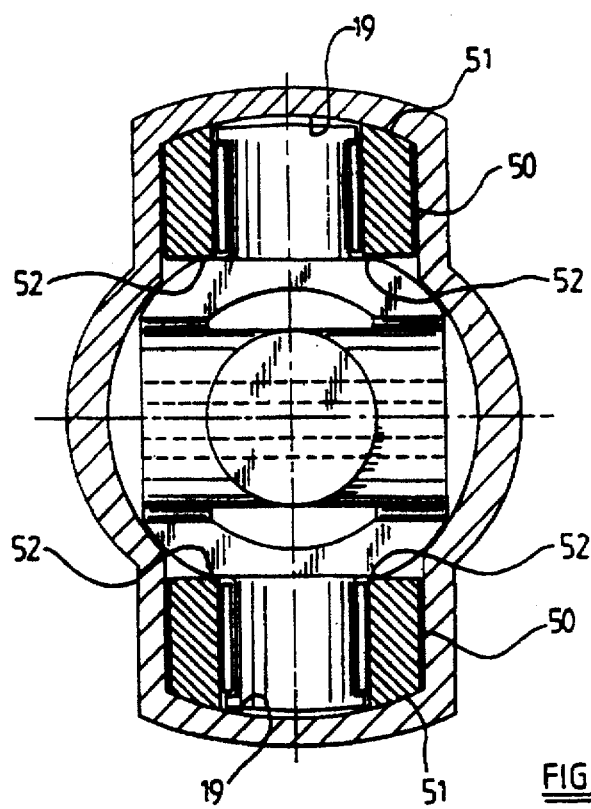

Referring now to FIG. 5, this shows part of a further embodiment of the joint in which the rollers, here indicated at 50, have annular part-spherical end surfaces 51 which engage the surfaces of the base portions 19 of the tracks. The opposite ends of the rollers 50, lying nearest the rotational axis of the joint member 10, engage shoulder portions 52 of the body 20, so that the body is centered relative to the tracks in the joint member 10, but by way of the rollers.

Otherwise, the embodiments of FIGS. 4 and 5 are constructed to operate as described in relation to FIGS. 1 to 3.

The invention thus provides a bipode type of universal joint which is caused to have constant velocity ratio transmission characteristics. The joint is highly efficient, and relatively inexpensive to manufacture compared with some other types of constant velocity ratio universal joints. In particular, the arrangement of the guide member 32, disposed between the joint members 10 and 11 at the closed end of the latter is relatively simple and straight-forward.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

I claim:

1. A universal joint comprising:
   a first joint member having a rotational axis;
   a body, and means connecting said body to said first joint member for pivotal movement relative thereto about a pivot axis intersecting and perpendicular to said rotational axis;
   said body comprising two trunnions extending along a trunnion axis perpendicular to said pivot axis of the body;
   respective rollers carried by the trunnions for rotation about the trunnion axis;
   a second joint member having a rotational axis and having two tracks extending axially with regard to said rotational axis of the second member, said tracks being diametrically opposed to one another about the rotational axis of the second joint member, said rollers being received in said tracks for torque transmission between the joint members by way of said body and rollers;
   centering means for centering the rotational axes of the first and second joint members relative to one another;
   a guide member having respective portions engaging the first and second joint members and the body for maintaining the trunnion axis in a plane bisecting the angle between the rotational axes of the first and second joint members;
   said guide member having a longitudinal axis and a first end portion, a second end portion, and an intermediate portion between said end portions, said portions being spaced along said longitudinal axis of the guide member;
   said first end portion of the guide member and the first joint member having respective complimentary formations which engage one another, said complementary formations comprising a projection and a recess;
   said second end portion of the guide member engaging the second joint member;
   said intermediate portion of the guide member engaging said body, said guide member having a part-spherical surface on said intermediate portion thereof and said body having a concave part-spherical surface facing said first joint member and engaging said part spherical surface of said intermediate portion; and
   said complimentary formation at the first end portion of the guide member comprising a surface of revolution of a gear tooth shape about an axis extending transversely to said longitudinal axis of the guide member and which passes through the center of curvature of said part-spherical surface of said intermediate portion of the guide member.

2. A universal joint according to claim 1 wherein the centering means comprises part-spherical surface portions provided on the body engaging portions of a part-cylindrical surface provided in the second joint member between the tracks thereof.

3. A joint according to claim 1 wherein the centering means comprises both end portions of the trunnions and of the rollers carried thereby engaging guide surfaces at the bases of the tracks in the second joint member.

4. A joint according to claim 3 wherein said guide surfaces at the bases of the tracks comprise respective portions of a cylindrical surface, and both the ends of the trunnions and the rollers carried thereby comprise respective portions of a part-spherical surface having substantially the same radius of curvature as that of said cylindrical surface.

5. A joint according to claim 1 wherein said projection is on the guide member and recess in the first joint member.

6. A joint according to claim 1 wherein at least said projection has a cross-sectional shape which is generally that of a gear tooth.

7. A joint according to claim 1 wherein the joint is a plunging joint and the guide member is movable axially relative to the second joint member.

8. A joint according to claim 7 wherein the guide member cooperates with an internal cylindrical surface provided in the second joint member.

9. A joint according to claim 1 wherein the rollers have substantially cylindrical external peripheral surfaces, and the tracks in the second joint member have planar opposing sides with which said surfaces of the rollers engage.

10. A joint according to claim 9 wherein the rollers are constrained against outward movement by being retained on the trunnions.

11. A joint according to claim 1 wherein the centering means comprises end portions of the trunnions engaging guide surfaces at the bases of the tracks in the second joint member.

12. A joint according to claim 11 wherein said guide surfaces at the bases of the tracks comprise respective portions of a cylindrical surface, and the ends of the trunnions comprise respective portions of a part-spherical surface having substantially the same radius of curvature as that of said cylindrical surface.

* * * * *

UNITED STATES PATENT AND TRADEMARK OFFICE
CERTIFICATE OF CORRECTION

PATENT NO. : 5,733,197

DATED : March 31, 1998

INVENTOR(S) : Stephen Charles Bartlett

It is certified that error appears in the above-identified patent and that said Letters Patent is hereby corrected as shown below:

Column 2, lines 22-23, "ill tile" should be --in the--.

Column 5, line 29, "dosed" should be --closed--.

Signed and Sealed this

Twelfth Day of January, 1999

Attest:

Attesting Officer

Acting Commissioner of Patents and Trademarks